United States Patent
Karunaratne et al.

(10) Patent No.: US 10,267,249 B2
(45) Date of Patent: Apr. 23, 2019

(54) SYSTEMS FOR AN ENGINE

(71) Applicant: General Electric Company, Schenectady, NY (US)

(72) Inventors: Milan Palinda Karunaratne, Anaheim, CA (US); Paul Lloyd Flynn, Lawrence Park, PA (US); James Robert Schreiner, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 43 days.

(21) Appl. No.: 15/140,252

(22) Filed: Apr. 27, 2016

(65) Prior Publication Data
US 2017/0314481 A1  Nov. 2, 2017

(51) Int. Cl.
F02D 41/00 (2006.01)
F02M 26/05 (2016.01)
F02M 26/06 (2016.01)

(52) U.S. Cl.
CPC ..... F02D 41/0052 (2013.01); F02D 41/0007 (2013.01); F02D 41/0085 (2013.01)

(58) Field of Classification Search
CPC ............. F02D 41/0052; F02D 41/0007; F02D 41/0085; G01M 15/05; G01M 15/10; G01M 15/106
USPC ......................................... 60/605.2; 701/108
See application file for complete search history.

(56) References Cited

U.S. PATENT DOCUMENTS

| | | | |
|---|---|---|---|
| 4,302,814 A | 11/1981 | Full et al. | |
| 4,424,709 A | 1/1984 | Meier, Jr. et al. | |
| 5,402,675 A | 4/1995 | Entenmann et al. | |
| 5,935,189 A | 8/1999 | Park | |
| 7,954,363 B2 | 6/2011 | Friis-Knudsen | |
| 8,626,371 B2 | 1/2014 | Kumar et al. | |
| 8,626,372 B2 | 1/2014 | Kumar et al. | |
| 2005/0193997 A1* | 9/2005 | Cullen | F02D 41/0087 123/698 |
| 2007/0022745 A1* | 2/2007 | Narita | F02M 26/42 60/285 |
| 2013/0073174 A1 | 3/2013 | Worden et al. | |
| 2013/0186376 A1* | 7/2013 | Peters | F02D 41/0065 123/568.2 |

(Continued)

FOREIGN PATENT DOCUMENTS

| | | |
|---|---|---|
| CA | 1139591 A1 | 1/1983 |
| WO | 1984000417 A1 | 2/1984 |

*Primary Examiner* — Thai Ba Trieu

(74) *Attorney, Agent, or Firm* — McCoy Russell LLP

(57) ABSTRACT

Systems are provided for detecting a change in performance of an engine component. In one example, a system includes a first pressure sensor of a first exhaust manifold coupled to a first subset of cylinders of an engine, a second pressure sensor of a second exhaust manifold coupled to a second subset of cylinders of the engine, a passage coupling the first exhaust manifold to an intake manifold, and a controller configured to detect a change in performance of any cylinder of the engine based on frequency content from the first pressure sensor and from the second pressure sensor during both a first mode where no exhaust gas from the first exhaust manifold is provided to the intake manifold, and during a second mode where all exhaust gas from the first exhaust manifold is provided to the intake manifold, and adjust an operating parameter responsive to the change in performance.

19 Claims, 6 Drawing Sheets

(56) References Cited

U.S. PATENT DOCUMENTS

| | | | |
|---|---|---|---|
| 2014/0026565 A1* | 1/2014 | Peters | F02D 41/0007 60/612 |
| 2014/0067228 A1* | 3/2014 | Polkus | F02D 41/0007 701/102 |
| 2014/0331978 A1 | 11/2014 | Goetzke et al. | |
| 2016/0069287 A1* | 3/2016 | Lavertu | F02D 41/0025 701/103 |
| 2016/0069301 A1* | 3/2016 | Karunaratne | F02M 26/43 123/568.12 |
| 2016/0138526 A1* | 5/2016 | Peters | G01L 11/04 123/568.16 |
| 2017/0089278 A1* | 3/2017 | Tulapurkar | F02D 41/0027 |

* cited by examiner

SYSTEMS FOR AN ENGINE

BACKGROUND

Technical Field

Embodiments of the subject matter disclosed herein relate to engine systems.

Discussion of Art

A multi-cylinder engine includes a plurality of individual cylinders. Each cylinder combusts air and fuel to power the engine. Over time, individual cylinders and/or components coupled to the individual cylinders (e.g., exhaust valves) may become degraded. Further, because fueling may be individually controlled for each cylinder, fueling may become uneven between all the cylinders of the engine. If individual cylinders are not being fueled accurately (e.g., amount or timing of fuel injection), or cylinders become degraded, engine misfire may occur and/or the efficiency of the engine may decrease. Further, if the output of the cylinders varies such that the cylinders are unbalanced, this may put stress on engine components, such as the crankshaft, bearings, and/or cylinder connecting rods. While some engines may utilize individual cylinder pressure sensors for measuring in-cylinder pressure for cylinder balancing purposes, this may increase engine component costs, increase control complexity, and increase unreliability of in-cylinder pressure sensors exposed to high combustion gas pressures and temperatures.

BRIEF DESCRIPTION

In an embodiment, a system includes a first exhaust pressure sensor for sensing exhaust pressure of a first exhaust manifold of an engine and a second exhaust pressure sensor for sensing exhaust pressure of a second exhaust manifold of the engine. The first exhaust manifold is coupled to a first subset of cylinders of the engine and the second exhaust manifold is coupled to a second subset of cylinders of the engine. The system includes an exhaust gas recirculation (EGR) system including an EGR passage coupling the first exhaust manifold to an intake manifold of the engine. The system further includes a controller. The controller is configured to detect a change in performance of any cylinder of the engine based on frequency content from the first exhaust pressure sensor and frequency content from the second exhaust pressure sensor during both a first mode where all exhaust gas from the first exhaust manifold is provided to the intake manifold, and during a second mode where no exhaust gas from the first exhaust manifold is provided to the intake manifold. The controller is configured to adjust one or more engine operating parameters responsive to detecting the change in performance.

DETAILED DESCRIPTION

The following description relates to systems and methods for control of engine-related systems, e.g., for control of an engine or a system related to the engine based on a diagnosis of the engine. Furthermore, embodiments of the subject matter disclosed herein use engine and/or exhaust system data, such as measured exhaust system pressure and/or engine parameters (e.g., temperature), to diagnose conditions of an engine or auxiliary equipment and to distinguish between conditions and associated engine components and auxiliary equipment.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
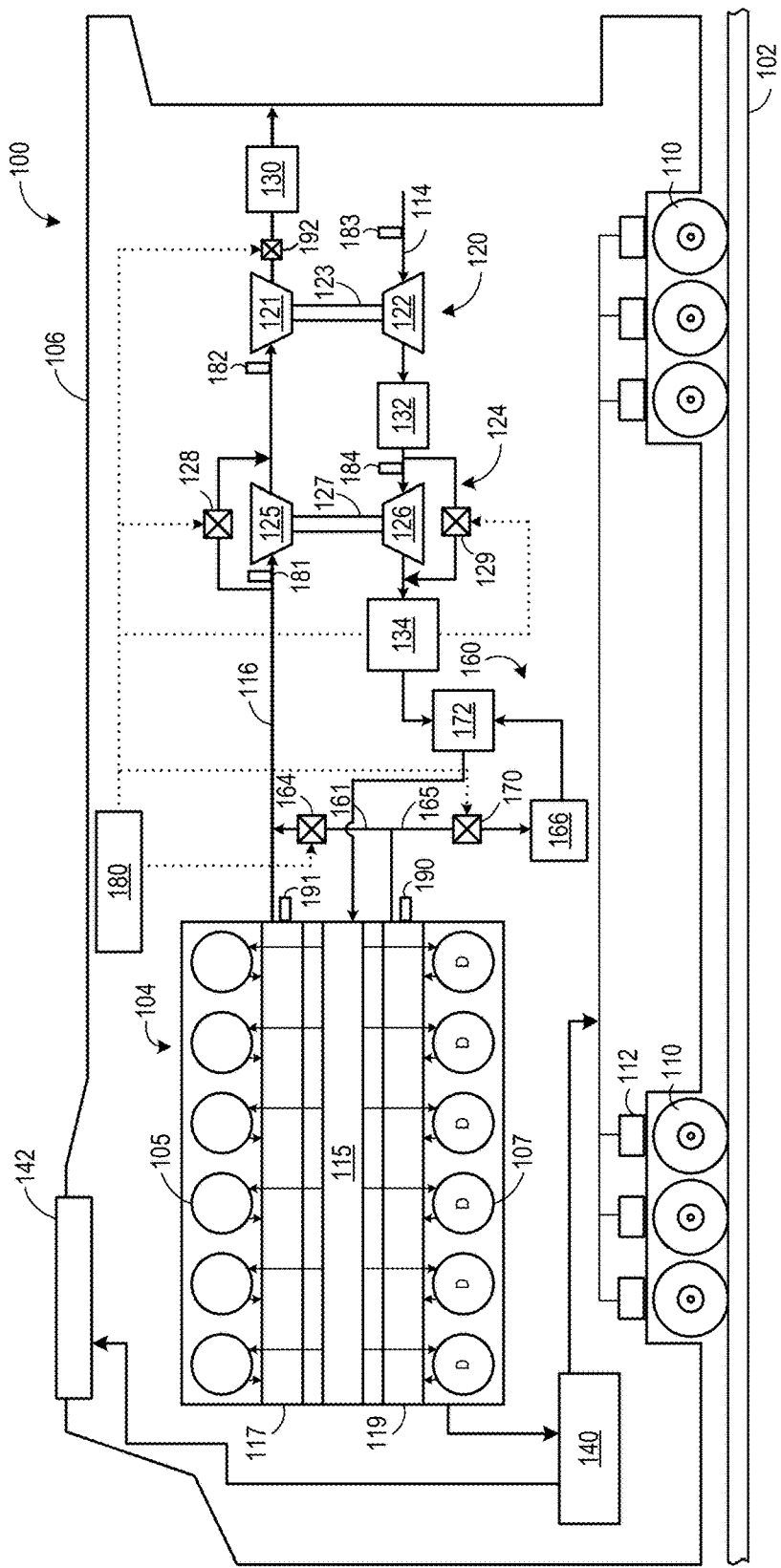
FIG. 1 shows an embodiment of a vehicle system.

Before further discussion of the approach for diagnosing an engine, an example of a platform is disclosed in which an engine may be configured for a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. In some examples, the engine may have an equal number of donor and non-donor cylinders. In other examples, the engine may have more donor cylinders than non-donor cylinders. In still further examples, the engine may be comprised entirely of donor cylinders. It should be understood, the engine may have any desired numbers of donor cylinders and non-donor cylinders. Further, in some embodiments, the donor cylinders only supply exhaust gas to the donor cylinder exhaust manifold and not to the non-donor cylinder exhaust manifold. In some embodiments, the non-donor cylinders only supply exhaust gas to the non-donor cylinder exhaust manifold and not to the donor cylinder exhaust manifold.

As depicted in FIG. 1, the non-donor cylinders 105 are coupled to the exhaust passage 116 to route exhaust gas from the engine to atmosphere (after it passes through first and second turbochargers 120 and 124, and in some embodiments, through aftertreatment system 130). The donor cylinders 107, which provide engine exhaust gas recirculation (EGR), are coupled exclusively to an EGR passage 165 of an EGR system 160 which selectively routes exhaust gas from the donor cylinders 107 to the intake passage 114 of the engine 104 or to atmosphere via the exhaust passage 116. By introducing cooled exhaust gas to the engine 104, the amount of available oxygen for combustion is decreased, thereby reducing combustion flame temperatures and reducing the formation of nitrogen oxides (e.g., $NO_x$). Additional details regarding EGR system 160 will be provided below.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressor 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

While not shown in FIG. 1, in some examples two low-pressure turbochargers may be present. As such, two charge air coolers (e.g., intercoolers) may be present, one positioned downstream of each low-pressure compressor. In one example, the low-pressure turbochargers may be present in parallel, such that charge air that flows through each low-pressure compressor is combined and directed to the high-pressure compressor.

While in the example vehicle system described herein with respect to FIG. 1 includes a two-stage turbocharger, it is to be understood that other turbocharger arrangements are possible. In one example, only a single turbocharger may be present. In such cases, only one charge air cooler may be utilized, rather than the two coolers depicted in FIG. 1 (e.g., intercooler 132 and aftercooler 134). In some examples, a turbo-compounding system may be used, where a turbine positioned in the exhaust passage is mechanically coupled to the engine. Herein, energy extracted from the exhaust gas by the turbine is used to rotate the crankshaft to provide further energy for propelling the vehicle system. Still other turbocharger arrangements are possible.

The vehicle system 100 optionally includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120 and an exhaust gas valve 192. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a NOx trap, and/or various other emission control devices or combinations thereof. However, in some examples the exhaust aftertreatment system 130 may be dispensed with and the exhaust may flow from the exhaust passage to atmosphere without flowing through an aftertreatment device.

The flow of EGR to the intake system via EGR passage 165 may be controlled by a first EGR valve 170. For example, when first EGR valve 170 is open, exhaust may be routed from the donor cylinders to the EGR cooler (explained in more detail below) and/or additional elements prior to being routed to the intake passage 114. Additionally, in some embodiments, the EGR system 160 may include an EGR bypass passage 161 that is coupled to EGR passage 165 and is configured to divert exhaust from the donor cylinders back to the exhaust passage. The EGR bypass passage 161 may be controlled via a second EGR valve 164. The second EGR valve 164 may be configured with a plurality of restriction points such that a variable amount of exhaust is routed to the exhaust, in order to provide a variable amount of EGR to the intake.

The first EGR valve 170 and second EGR valve 164 may be on/off valves controlled by the control unit 180 (for turning the flow of EGR on or off), or they may control a variable amount of EGR, for example. In some examples, the first EGR valve 170 and second EGR valve 164 may be actuated in tandem to coordinately control EGR flow. For example, when first EGR valve 170 is fully closed, second EGR valve 164 may be fully open, and when first EGR valve 170 is fully open, second EGR valve 164 may be fully closed. In some embodiments, the alternate EGR system may include a plurality of EGR valves or other flow control elements to control the amount of EGR.

In such a configuration, the second EGR valve 164 is operable to route exhaust from the donor cylinders to the exhaust passage 116 of the engine 104 and the first EGR valve 170 is operable to route exhaust from the donor cylinders to the intake passage 114 of the engine 104. As such, the second EGR valve 164 may be referred to as an EGR bypass valve, while the first EGR valve 170 may be referred to as an EGR metering valve. In the embodiment shown in FIG. 1, the second EGR valve 164 and the first EGR valve 170 may be engine oil, or hydraulically, actuated valves, for example, with a shuttle valve (not shown) to modulate the engine oil. In some examples, the valves may be actuated such that one of the first and second valves 170 and 164 is normally open and the other is normally closed. In other examples, the first and second valves 170 and 164 may be pneumatic valves, electric valves, or another suitable valve.

Exhaust gas flowing from the donor cylinders 107 to the intake passage 114 passes through one or more a heat exchangers such as an EGR cooler 166 to reduce a temperature of (e.g., cool) the exhaust gas before the exhaust gas returns to the intake passage. In some examples, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include one or more EGR cooler bypasses to bypass EGR cooler 166. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler may be directed to the exhaust passage 116 rather than the intake passage 114.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system (not shown) which routes exhaust gas from downstream of the turbochargers 120 and 124 in the exhaust passage 116 to a location upstream of the turbochargers 120 and 124 in the intake passage 114.

In some examples, the EGR valves 164 and 170 and/or turbine bypass valve 128 may each be comprised of a butterfly valve configured to move via a respective hydraulic actuator. The butterfly valve may include a rotatable plate positioned in an exhaust or EGR passage. Each actuator may include a pinion coupled to a shaft of the butterfly valve. The pinion is rotated via a rack, which is translated laterally via pressure provided by hydraulic fluid. In the example described herein, the actuator is provided with engine lubricating oil, from an engine oil supply, such as the main engine oil gallery, for example. However, other hydraulic fluid sources are possible.

The pinion includes a plurality of teeth that interlock with a plurality of teeth of the rack. When the teeth on the pinion mesh with the teeth on the rack, lateral movement of the rack results in rotational movement of the pinion. The rack is coupled to a piston, which defines two fluid chambers, fluid chamber A and fluid chamber B, on either side of the piston. When fluid chamber A is provided with hydraulic fluid (e.g., engine oil), the volume of fluid chamber A increases and the volume of fluid chamber B decreases, causing the piston and the rack to move in a first direction (e.g., towards fluid chamber B), and causing the pinion to rotate counterclockwise. Conversely, when fluid chamber B is provided with hydraulic fluid, the volume of fluid chamber B increases, the volume of fluid chamber A decreases, and the rack moves in a second direction (e.g., towards fluid chamber A), causing the pinion to rotate clockwise.

The actuator may include two fluid passages, each coupled to a respective fluid chamber. Hydraulic fluid may enter and exit each fluid chamber through the respective fluid passage. Hydraulic fluid may be supplied to the actuator via a supply passage. Hydraulic fluid may be supplied from the engine oil supply via one or more pumps, such as a primary oil pump (driven by the engine, for example, and configured to pump oil to one or more engine components) and/or a secondary oil pump (driven by a motor, for example). The actuator may also include an outlet to drain excess hydraulic fluid back to the engine oil supply. Oil may be supplied to the actuator by a solenoid that is controlled by a controller (such as control unit 180 of FIG. 1). The solenoid may receive feedback from feedback spring, for example the feedback spring may counter a force provided by the solenoid. The feedback spring may compress or expand in response to movement of a cam profile of the pinion. Further, in some examples, a force balance between the feedback spring and a null spring may change as the position of the pinion changes until the spring force equals the magnetic force generated by the solenoid as generated by the commanded signal from the controller. When the spring forces are balanced, hydraulic fluid may be blocked from flowing into or out of the fluid passages, thus holding the butterfly valve in a fixed position.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged at the inlet of turbine 125, sensor 182 arranged in the inlet of turbine 121, sensor 183 arranged in the inlet of the low-pressure compressor, and sensor 184 arranged in the inlet of the high-pressure compressor. The sensors 181, 182, 183, and 184 may detect temperature and/or pressure. Further, one or more exhaust pressure sensors may be present to detect exhaust pressure. As shown, a first exhaust pressure sensor 190 is positioned to detect exhaust pressure in donor cylinder exhaust manifold 119 while a second exhaust pressure sensor 191 is positioned to detect exhaust pressure in non-donor cylinder exhaust manifold 117. Sensors 190 and 191 may be positioned in or otherwise coupled to the respective exhaust manifolds, as shown, or the sensors may be positioned in the EGR passage 165 and exhaust passage 116, respectively, or other suitable location. Additional sensors may include, but are not limited to, engine speed, engine load, boost pressure, ambient pressure, engine temperature, coolant system temperature, etc. Correspondingly, the control unit 180 may control the vehicle system 100 by sending commands to various components such as traction motors, alternator, cylinder valves, throttle, heat exchangers, wastegates or other valves or flow control elements, EGR valves 164 and/or 170, turbine bypass valve 128, etc.

According to embodiments disclosed herein and described in more detail below, the frequency content of system exhaust pressures may be analyzed to identify a cylinder that is undergoing or has undergone a change in performance, for example due to a degraded fuel injector. The pulsations of each firing cylinder in the exhaust stream may be leveraged to determine the health of each cylinder via the half order (or harmonics) associated with the spectral analysis of the exhaust pressure sensors. The engine control system may then leverage this knowledge to tune performance to optimize engine efficiency and emissions compliance while protecting the engine.

If a cylinder has a degraded fuel injector (e.g., a fuel injector that is not providing fuel), the exhaust pulse that comes out of that cylinder will have less pressure than the rest of the contributing cylinders. In a V-12, four stroke engine, each cylinder fires once every other revolution of the crankshaft. Therefore, each cylinder will have a specific pulse contribution into the exhaust manifold. This specific pulsation will resonate throughout the exhaust system and can be identified in a half order spectral analysis of the system exhaust pressure sensors. Similarly, if one cylinder starts to over-fuel, the contribution into the exhaust stream will once again be specific and thus identifiable in a spectral analysis of the exhaust pressure sensor.

Once the cylinder change in performance is identified, the control system may take necessary adjustments to optimize engine performance, efficiency, and emissions compliance. If necessary, the control system may also reduce all fueling to the identified cylinder to help protect the engine of any further secondary damage that may occur.

Once the control system is aware that there is one cylinder that is firing incorrectly (too much fuel or too little fuel), the control system can take action to determine which cylinder in the engine has undergone the change in performance. This can be done by looking at both the magnitude and phase of the transformation of the signal output from the exhaust pressure sensor around the target frequency or frequency of interest, such as the half order. The control system may gain a point of reference for which revolution the engine is on to make valuable information out of the phase angle. This can be done by leveraging inputs from the camshaft sensor signal and crankshaft sensor signal. For example, there may be 90 teeth on a wheel coupled to the crankshaft, each of which are sensed by the crankshaft sensor. Therefore, for two revolutions of the engine (in a 4-stroke engine), 180 teeth will pass by the crankshaft sensor. If the control system looks at the exhaust pressure value at every tooth crossing, in conjunction with the camshaft sensor signal, the control system may be able to detect which cylinder is firing (based on a pre-determined cylinder firing order). Then the phase angle results from the exhaust pressure pulsations at the half order can be tied to that firing order to determine which cylinder is causing the rise in the half order frequency response. The control system may then take specific action around that cylinder to either optimize performance of the engine given a compromised cylinder, or cut fueling to that cylinder to help protect the engine from further damage. Further, in engines configured to operate on multiple types of fuel, this type of frequency based analysis could apply to health monitoring around relative ratios of one fuel to another. For example, engines may be configured to operate with a gaseous fuel such as natural gas and a liquid fuel such as diesel. The health of each cylinder may be monitored based on output from the one or more exhaust pressure sensors and if a half-order response is detected, the ratio of gaseous fuel to liquid fuel may be adjusted, e.g., decreased.

The exhaust pressure approach described above could also be used to drive different degrees of injector health over time. As an injector starts to degrade over time, the impact on the half order or frequency content in the exhaust pressure system will start to drift and gradually increase. A threshold based approach may be taken to drive proactive maintenance, for example once the half order response starts to increase (even if the half order response does not indicate the injector is noticeably degraded), a diagnostic code or notification to an operator may be generated to indicate that proactive maintenance on an injector is recommended.

Figure 2:
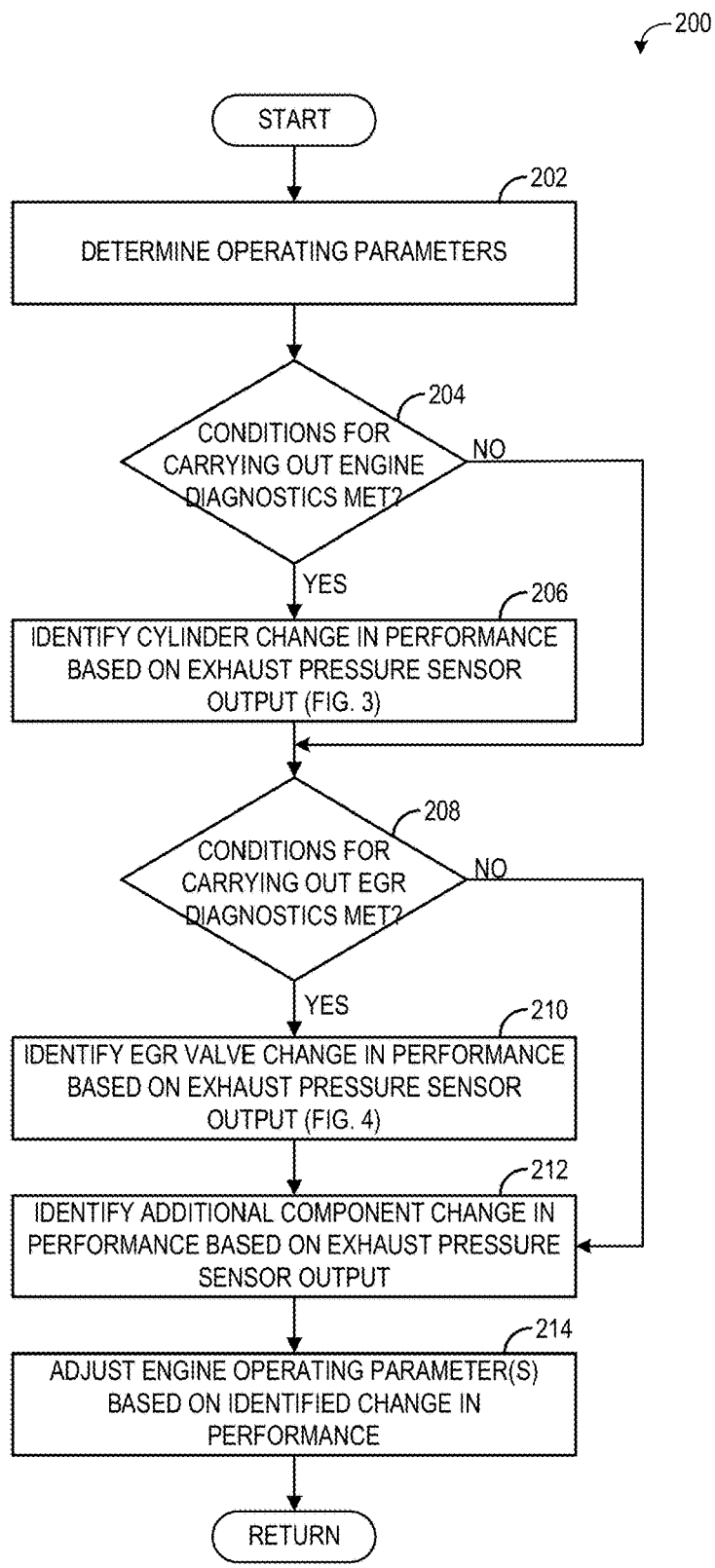
FIG. 2 shows a flow chart illustrating a method for diagnosing one or more engine system components based on output from one or more pressure sensors.

Turning now to FIG. 2, a method 200 for detecting a change in performance of one or more engine system components is presented. Method 200 is carried out according to non-transitory instructions stored in memory of a control unit (such as control unit 180 of FIG. 1) in combination with various sensors and actuators, and detects a change in performance of an engine cylinder, EGR valve, or other component based on output from one or more exhaust pressure sensors, such as sensors 190 and 191 of FIG. 1.

At 202, method 200 includes determining engine operating parameters. The determined engine operating parameters include, but are not limited to, engine status (e.g., whether the engine is spinning and/or combusting fuel), exhaust pressure, engine speed and load, engine temperature, exhaust temperature, and other parameters. At 204, method 200 determines if conditions for carrying out engine diagnostics are met. As will be discussed in more detail with respect to FIG. 3, in one example the engine diagnostics include identifying if any cylinder of the engine has undergone a change in performance (due to a degraded fuel injector, for example) based on output from the a first exhaust pressure sensor configured to measure exhaust pressure of a first exhaust manifold and a second exhaust pressure sensor configured to measure exhaust pressure of a second exhaust manifold. In this example, the engine diagnostics are performed in two engine operating modes, a first mode where all exhaust from the first exhaust manifold is directed back to the engine intake (also referred to as full donor EGR mode), and a second mode where all exhaust from the first exhaust manifold is directed to the exhaust system and eventually to atmosphere (also referred to as an EGR disabled mode). As such, the conditions for carrying out the engine diagnostics may include the engine operating under conditions that allow for full donor EGR followed by no EGR (or vice versa). In one example, this may include during or immediately after an engine start-up, during idle conditions, or other suitable conditions.

If conditions for carrying out the engine diagnostics are not met, method 200 proceeds to 208, which will be described in more detail below. If the conditions for carrying out the engine diagnostics are met, method 200 proceeds to 206 to identify a cylinder change in performance based on exhaust pressure sensor output, which will be explained in more detail below with respect to FIG. 3. Briefly, the engine diagnostic routine includes sampling the exhaust pressure sensors to obtain a first signal representative of exhaust pressure of the first exhaust manifold and a second signal representative of exhaust pressure of the second exhaust manifold. The first and second signals are transformed into the frequency domain (by performing a fast Fourier transform, for example), and a selected frequency component from each transformed signal is identified. The magnitude of each selected frequency component is compared to a respective threshold magnitude or range of magnitudes to identify a frequency signature that indicates a change in performance of a cylinder of the engine. Further diagnostics may be performed to determine which cylinder has undergone the change in performance and/or if the change in performance is due to an under-fuel event or an over-fuel event.

At 208, method 200 determines if conditions for carrying out EGR diagnostics are met. In one example, explained in more detail below with respect to FIG. 4, the EGR diagnostics include analyzing exhaust pressure sensor output to identify a change in performance of one or more EGR valves, such as valves 164 and/or 170 of FIG. 1. In this example, the EGR valves may be moved or held in a specific position during the diagnostic routine, and as such the conditions for carrying out the EGR diagnostics may include engine operation under conditions that allow for the EGR valves to be moved or held in the specific position(s), which may include during or immediately after engine start-up, during engine idle, or other suitable conditions.

If the conditions for carrying out the EGR diagnostics are not met, method 200 proceeds to 212, which will be explained in more detail below. If the conditions for carrying out the EGR diagnostics are met, method 200 proceeds to 210 to identify an EGR valve change in performance based on exhaust pressure sensor output, which will be described below with respect to FIG. 4. Briefly, the EGR diagnostic routine includes sampling the exhaust pressure sensors to obtain a first signal representative of exhaust pressure of the first exhaust manifold and a second signal representative of exhaust pressure of the second exhaust manifold. The first and second signals are transformed into the frequency domain (by performing a fast Fourier transform, for example), and a selected frequency component from each transformed signal is identified. A change in performance of one or both EGR valves may be identified based on parameters of the respective selected frequency components.

At 212, method 200 optionally includes identifying additional component change in performance based on exhaust pressure sensor output. Exhaust pressure sensor output may be monitored to detect the health of other engine and/or vehicle system components. One example includes an exhaust leak in the system due to a failed gasket or component, which may result in the form of a high frequency "hiss." The exhaust pressure sensors located in the exhaust stream may detect the presence of the high frequency hiss based on the output of a spectral analysis. For example, selected high frequency components of the transformed exhaust pressure signals described above may be analyzed and a leak may be identified when one or more of the selected frequency components have a magnitude greater than a threshold magnitude. In one example, the high frequency components may be higher than the engine firing frequency.

The presence of the high frequency hiss may be used to inform the control system of a specific degradation (e.g., exhaust leak) which could drive proactive maintenance, including a diagnostic code or other information that may lead a mechanic to evaluate the exhaust piping first for leaks. This type of proactive maintenance may help save road failures by not allowing the leak to get worse and possibly run into cases of power deration and/or hot exhaust shutdowns.

Another example engine component that may be evaluated based on exhaust pressure sensor output is a turbocharger. As explained above, the engine system may include a two stage turbocharger system including a pressure sensor at the inlet to the high-pressure turbine (such as sensor 181 of FIG. 1) and another pressure sensor at the interstage between the two turbochargers (at the inlet of the low-pressure turbine, such as sensor 182 of FIG. 1). In the event that one of these turbochargers has a damaged turbine blade, a small deterrent in the pulsating exhaust backpressure may be detected by the respective sensor, and thus a frequency analysis of that exhaust pressure sensor reading right before the turbine inlet may be able to detect failures or defects on the turbine wheel. A rotational frequency or blade count frequency analysis may be performed. In the event there is a turbine blade defect, the respective sensor has potential to pick up a variation in back pressure every time that defect goes around. In one example, the blade rotational frequency may be determined, and turbocharger change in performance may be indicated when a magnitude of that frequency component (or its harmonics) is different than expected. Similarly, there may be one or more pressure sensors located at the cold inlet(s) to the HP and LP compressors, therefore a similar approach can be taken to evaluate the health of the compressor side of the turbocharger.

A further component that may be diagnosed using exhaust pressure sensor output is cylinder exhaust valves. When a cylinder head exhaust valve is degraded due to exposure to high temperatures or other conditions, the exhaust chamber will no longer see a sharp pressure pulse out of that particular cylinder because the exhaust valve is not sealing very well. Instead, a more gradual increase in pressure will be expected from that cylinder. This will result in the reduction of one specific pressure pulse that will impact the half order frequency content in the exhaust stream.

In one example, a degraded cylinder exhaust valve may be differentiated from a degraded fuel injector based on the magnitude of the half-order frequency content. When a fuel injector is degraded (e.g., stops injecting fuel) the cylinder will still seal so there will be an exhaust pulse that is detectable by the exhaust pressure sensor, even when a combustion event does not occur. In contrast, when a cylinder exhaust valve is leaky or stuck, the in-cylinder pressure may be lower because that particular cylinder will not be able to build any (or very limited) pressure due to the cylinder not being sealed. Therefore, during the compression stroke, the exhaust pressure sensor will be seeing the charge air being pushed into the exhaust stream, then during the exhaust stroke there will be very little "pulse" that goes into the exhaust. In such an example, a steady stream of charge air may be leaked to the exhaust stream.

Thus, the magnitude of the half-order frequency component of the exhaust pressure sensor output may be analyzed to differentiate a change in performance of a fuel injector from a change in performance of a cylinder exhaust valve. In one example, a first percentage increase in the half-order response may be observed when a fuel injector is degraded, while a second, larger (e.g., 50% larger) half-order response may be observed when a cylinder exhaust valve is degraded.

At 214, method 200 includes adjusting one or more engine operating parameters based on the identified change in performance. Once an engine system component having a change in performance has been detected, various actions may be taken to mitigate any engine system performance issues that may arise due to operation with the degraded component. The engine control system may take action to adjust EGR rates and valves accordingly to adequately compensate for a lack of an injector firing as intended. This adjustment could be made to help maintain emissions compliance to a certain degree even with a compromised system. In another example, the engine control system could also leverage the information associated with the over-fueling of an injector which will have a similar response in the frequency content, to reduce fueling out to that injector to help protect the engine from continued over-fueling (due to a degraded injector nozzle) and risking cylinder, liner, and/or overall engine degradation. The control system could also be used to derate overall load or power on the engine to help mitigate progression of a degradation and allow the vehicle enough opportunity to travel back to a designated location. In further examples, a diagnostic code may be stored indicating the change in performance to aid in future service of the vehicle and/or an operator may be notified of the change in performance. Method 200 then returns.

Figure 3:
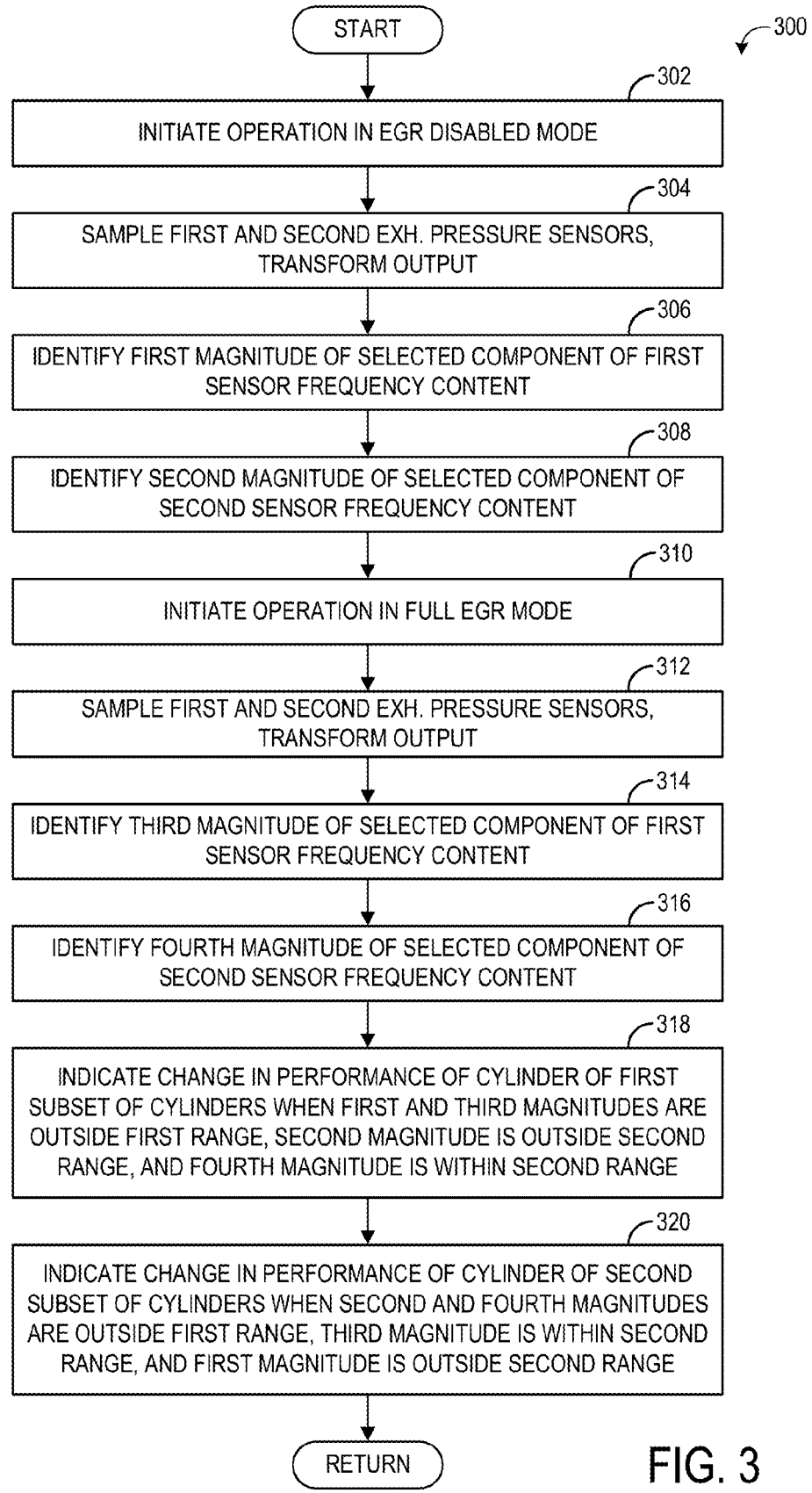
FIG. 3 is a flow chart illustrating a method for diagnosing an engine based on output from the one or more pressure sensors.

FIG. 3 is a flow chart illustrating a method 300 for performing an engine diagnostic routine to determine the health of the cylinders of the engine based on output from a first pressure sensor and a second pressure sensor. The first pressure sensor may measure pressure of a first exhaust manifold that is configured to provide EGR to the engine, also referred to as a donor cylinder manifold. An example of such a manifold is exhaust manifold 119 of FIG. 1 and an example of such a sensor is sensor 190 of FIG. 1. The second pressure sensor may measure pressure of a second exhaust manifold that is configured to provide all exhaust to atmosphere, also referred to as a non-donor cylinder manifold. An example of such a manifold is exhaust manifold 117 of FIG. 1 and an example of such a sensor is sensor 191 of FIG. 1.

At 302, method 300 includes initiating operation in an EGR disabled mode. In EGR disabled mode, no exhaust from the first exhaust manifold is routed back to the intake manifold of the engine. As such, the EGR valves are positioned to block flow of exhaust from the first exhaust manifold to the intake system and allow flow of exhaust from the first exhaust manifold to the exhaust system. For example, a first EGR valve (such as EGR valve 170 of FIG. 1) is fully closed and a second EGR valve (such as EGR valve 164 of FIG. 1) is fully open. In the EGR disabled mode, exhaust communication between the first exhaust manifold and the second exhaust manifold may occur due to flow of exhaust from the first exhaust manifold to the exhaust system.

At 304, method 300 includes sampling the first and second exhaust pressure sensors to generate a first exhaust pressure signal and a second exhaust pressure signal. Each of the first and second exhaust pressure signals are transformed into the frequency domain using a fast Fourier transform or other suitable transformation to generate first sensor frequency content and second sensor frequency content. At 306, method 300 includes identifying a first magnitude of a selected frequency component of the first sensor frequency content. The selected frequency component may be the half order frequency component, which represents a signal component that occurs each half revolution of the crankshaft. However, other frequency components may additionally or alternatively be identified, such as the first order frequency.

At 308, method 300 includes identifying a second magnitude of a selected frequency component of the second sensor frequency content. The selected frequency component may be the half order frequency component or other suitable frequency component. The first and second magnitudes may be stored in the memory of the control unit for future analysis, as described below.

At 310, method 300 includes initiating operation in a full EGR mode. During the full EGR mode, no exhaust from the first exhaust manifold is routed to the exhaust system, and all exhaust from the first exhaust manifold is routed to the intake manifold. To achieve this, the first EGR valve (e.g., EGR valve 170 of FIG. 1) may be moved to the fully open position while the second EGR valve (e.g., EGR valve 164) may be moved to the fully closed position. In the full EGR mode, no communication may occur between the first exhaust manifold and the second exhaust manifold.

At 312, method 300 includes sampling the first and second exhaust pressure sensors to generate a first exhaust pressure signal and a second exhaust pressure signal. Each of the first and second exhaust pressure signals are transformed into the frequency domain using a fast Fourier transform or other suitable transformation to generate first sensor frequency content and second sensor frequency content. At 314, method 300 includes identifying a third magnitude of a selected frequency component of the first sensor frequency content. The selected frequency component may be the half order frequency component, or other frequency components may additionally or alternatively be identified, such as the first order frequency.

At 316, method 300 includes identifying a fourth magnitude of a selected frequency component of the second sensor frequency content. The selected frequency component may be the half order frequency component or other suitable frequency component. The third and fourth magnitudes may be stored in the memory of the control unit for future analysis, as described below.

The magnitudes of the selected frequency components from the signal output from the first pressure sensor and the signal output from the second pressure sensor during the two modes of operation (full donor EGR and EGR disabled) may be compared to various respective threshold magnitudes in order to determine if a change in performance is present in any cylinder of the engine. In one example, if any of the first, second, third, and fourth magnitudes is greater than a threshold magnitude, a cylinder change in performance may be indicated, and then further analysis of the frequency content of the signals (e.g., the phase of the first and/or second pressure sensor signal frequency content and correlation to the engine camshaft and/or crankshaft signal and engine firing order) may indicate which cylinder is exhibiting the change in performance.

However, to boost the signal to noise to ratio, reduce false positive identifications, or otherwise aid in detection of a degraded cylinder, all four magnitudes may be collectively analyzed and cylinder change in performance indicated when the magnitudes exhibit a certain signature. This may include, as described below, the magnitude of the selected frequency component from the signal output by one of the pressure sensors being above a threshold magnitude during both the full donor EGR mode and during the EGR disabled mode. For example, if each of the first magnitude and the third magnitude are greater than a threshold magnitude, the control unit may indicate that a cylinder of the first subset of cylinders (coupled to the first exhaust manifold and hence the first exhaust sensor) is exhibiting a change in performance.

As explained previously, the first pressure sensor may measure exhaust pressure of a first exhaust manifold coupled to a first subset of cylinders, while the second exhaust pressure sensor may measure exhaust pressure of a second exhaust manifold coupled to a second subset of cylinders. In some examples, such as shown in FIG. 1, the first subset of cylinders may arranged on a first bank while the second subset of cylinders may be arranged on a second, different bank. Further, in some examples, during the EGR disabled mode, the two exhaust manifolds may be in at least partial fluidic exhaust communication. As a result, even when a cylinder of the first subset of cylinders is exhibiting a change in performance, the second exhaust pressure sensor may still detect an aberration in the exhaust pressure that is detectable by analyzing the half order frequency component of the second exhaust pressure sensor signal. However, in some examples, the second exhaust pressure sensor may not detect the change in exhaust pressure resulting from the cylinder of the first subset of cylinders having a change in performance during the full donor EGR mode, as no fluidic communication occurs between the two exhaust manifolds during the full donor EGR mode.

Figure 7:
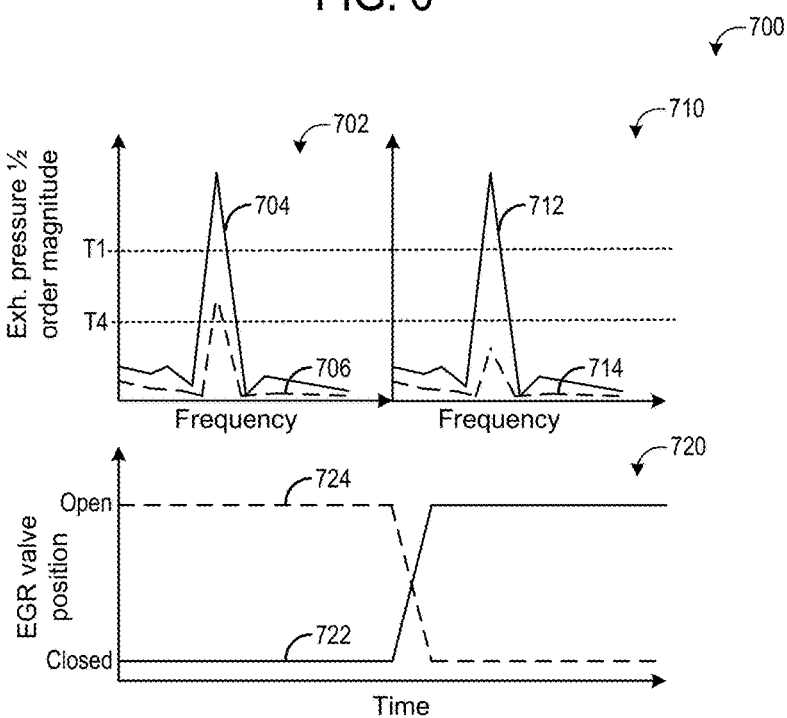
FIG. 7 is a diagram illustrating example frequency components of signals output by exhaust pressure sensors during different modes of operation.

Thus, in some examples, method 300 includes, at 318, indicating a change in performance of a cylinder of a first subset of cylinders of the engine when the first, second, third, and fourth magnitudes create a select signature. The signature includes both the first and third magnitudes being outside a first range of magnitudes. The signature may also include the second magnitude being outside a second range of magnitudes and the fourth magnitude being within the second range of magnitudes, where the second range of magnitudes is within (and smaller than) the first range of magnitudes. An example of such a signature is illustrated in FIG. 7 and described in more detail below.

In this way, the half order frequency component of the signal output by the first pressure sensor has a magnitude that is greater than a threshold magnitude (or has a magnitude that is different than an expected range of magnitudes) during both the full donor EGR mode and the EGR disabled mode. The threshold magnitude or range of magnitudes may be the magnitude(s) expected when the engine is operating without a cylinder having a change in performance (e.g., all cylinders are healthy). Further, the half order frequency component of the signal output by the second pressure sensor has a magnitude that is lower than the threshold magnitude/within the first range of magnitudes, yet is still higher (or outside of) a second range of magnitudes, during the EGR disabled mode, while the half order frequency component of the signal output by the second pressure sensor has a magnitude that is within the second range of magnitudes during the full donor EGR mode.

Figure 5:
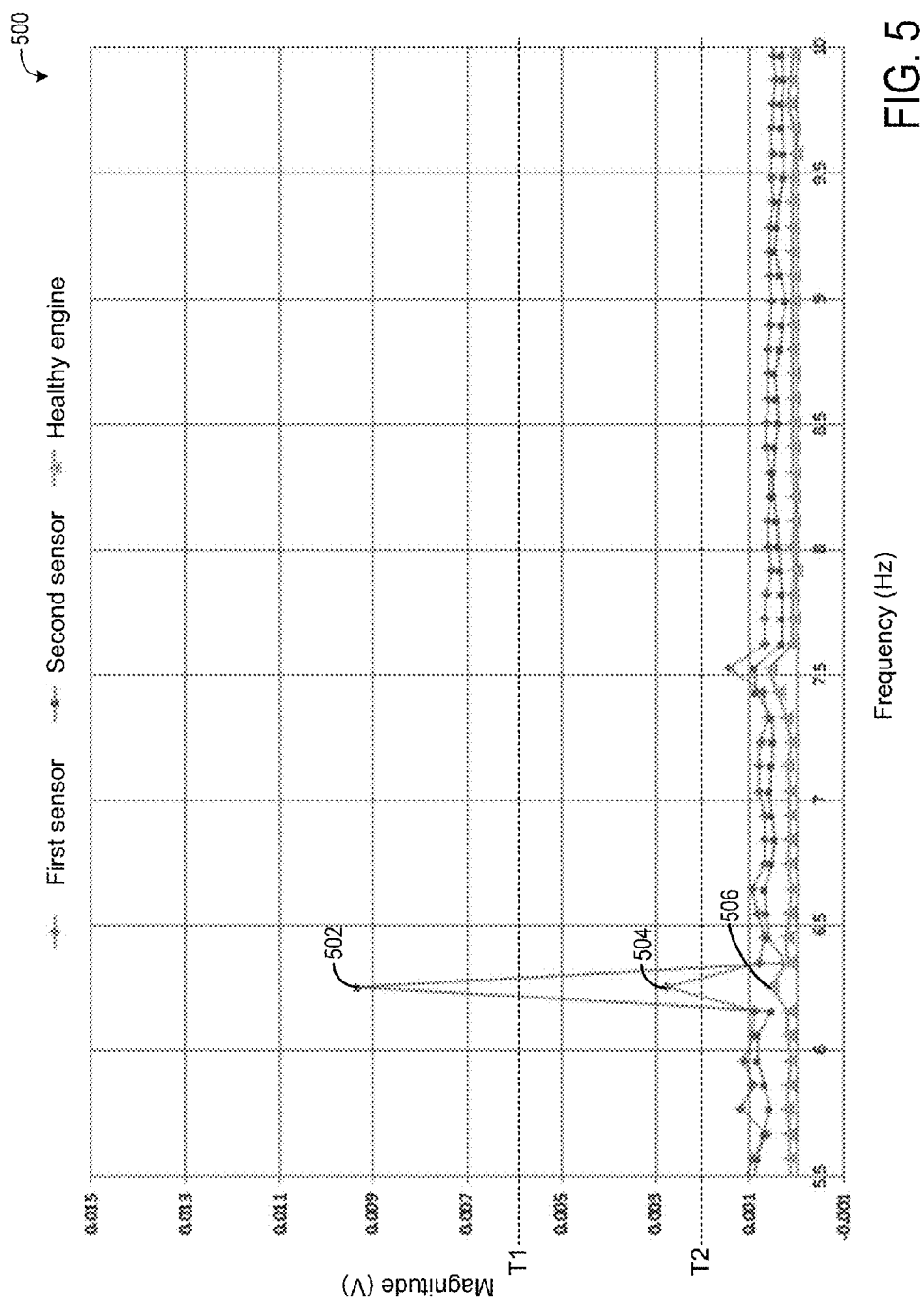
FIG. 5 is a diagram illustrating example frequency components of signals output by exhaust pressure sensors during different modes of operation.

An example diagram 500 showing example half-order frequency components from a signal output from the first pressure sensor and a signal output from the second pressure sensor is illustrated in FIG. 5. Diagram 500 plots sensor voltage as a function of frequency (Hz) for the first pressure sensor signal (as shown by the line with diamond-shaped plot points) and second pressure sensor signal (as shown by the line with square-shaped plot points) during a cylinder under-fueling event of the first subset of cylinders, as well as a representative pressure signal (as shown by the line with triangular-shaped plot points) that may be observed during operation with no cylinder change in performance (e.g., a healthy engine). For all pressure sensor signals, the engine at time of sampling of the sensors was operating at 750 RPM, resulting in a half-order frequency of 6.25 Hz.

As shown in diagram 500, the magnitude 502 of the half-order frequency component of the signal output by the first pressure sensor is greater than the magnitude 504 of the half-order frequency component of the signal output by the second pressure sensor, as well as the magnitude 506 of the half-order frequency component of the signal output by one of the pressure sensors during a condition with no cylinder change in performance, due to the cylinder of the first subset of cylinders exhibiting a change in performance (e.g., being under-fueled). As shown, the magnitude 502 is greater than a threshold magnitude (T1). However, also as shown, the magnitude 504, while less than the threshold magnitude T1, is greater than a second threshold magnitude T2. Accordingly, the magnitude 502 is outside a first range of magnitudes while the magnitude 504 is within the first range of magnitudes (e.g., the magnitude is less than the threshold T1) yet is outside a second range of magnitudes (e.g., the magnitude is greater than the threshold T2). As described above, in some examples both half-order frequency components from the first pressure sensor and second pressure sensor may be used to detect a cylinder change in performance.

Returning to FIG. 3, method 300 includes, at 320, indicating a change in performance of a cylinder of a second subset of cylinders of the engine when the first, second, third, and fourth magnitudes create a select signature. The signature includes both the second and fourth magnitudes being outside the first range of magnitudes. The signature may also include the first magnitude being outside the second range of magnitudes and the third magnitude being within the second range of magnitudes. In this way, the half order frequency component of the signal output by the second pressure sensor has a magnitude that is greater than a threshold magnitude (or has a magnitude that is different than an expected range of magnitudes) during both the full donor EGR mode and the EGR disabled mode. The threshold magnitude or range of magnitudes may be the magnitude(s) expected when the engine is operating without a cylinder having a change in performance (e.g., all cylinders are healthy). Further, the half order frequency component of the signal output by the first pressure sensor has a magnitude that is lower than the threshold magnitude/within the first range of magnitudes, yet is still higher (or outside of) a second range of magnitudes, during the EGR disabled mode, while the half order frequency component of the signal output by the first pressure sensor has a magnitude that is within the second range of magnitudes during the full donor EGR mode.

In this way, a misfire or other change in performance of any cylinder of the engine may be identified by analyzing the half-order frequency components of signals output from one or more exhaust pressure sensors of the engine. By analyzing the half-order frequency components from both the first pressure sensor (configured to measure exhaust pressure of the first, donor cylinder manifold) and the second pressure sensor (configured to measure exhaust pressure of the second, non-donor cylinder manifold), during both a full donor EGR mode and an EGR disabled mode, a cylinder with a change in performance (e.g., misfire or over-fuel event) may be identified in a robust manner.

To distinguish between an over-fueled and under-fueled cylinder, the inputs of multiple sensors may be used. In the case of an under-fueled cylinder, the exhaust frequency content will show a half order response and the corresponding subset of cylinders will also show a decrease in exhaust temperature due to one under-fueled cylinder. The collection of these two independent sensors may be used to determine that the cylinder is under-fueled. In the event the cylinder is over-fueling, the exhaust pressure sensor will also show a half order response, but in this case the exhaust temperatures would be expected to increase due to the one cylinder combusting more fuel than normal. The collection of these two pieces of information may be used to conclude that one cylinder is over-fueling. Additional detail regrading differentiating types of cylinder change in performance will be presented below with respect to FIG. 6. Further, the exact cylinder undergoing the change in performance may be identified based on the phase of the half-order frequency component as well as the engine firing order, camshaft angle, and/or crankshaft angle.

Once a cylinder that is exhibiting a chance in performance is identified, various actions may be taken to mitigate any further change in performance to the cylinder, engine, or other components. For example, the commanded fuel injection amount and/or timing may be adjusted (e.g., less fuel may be injected), or fueling to that cylinder may be cut altogether and remaining cylinders may receive additional fuel. Further, if the cylinder having a change in performance is located in the first subset of cylinders that provides EGR (e.g., the donor cylinders), the amount of EGR provided to the intake may be increased to compensate for the reduced amount of exhaust produced by that subset of cylinders.

As described above, another engine system component that may be evaluated with exhaust pressure sensors is an EGR valve. In the event that an EGR valve in the engine has a worn out drive shaft and has developed play in the actuator control, the engine control system may not detect the worn out drive shaft based on position feedback (due to the excessive play from the worn out drive shaft). However, the use of the exhaust pressure sensors could be leveraged to pick up the increased degree of "dither" or fluctuations in the EGR valve. The increased dither or high frequency movements in the EGR valve will create a specific frequency content in the exhaust pressure pulse and via a transformation (e.g., fast Fourier transform), this frequency content could be analyzed to identify worn out or failed EGR valves. The strategy could utilize either or both pressure sensors on each cylinder manifold (donor and non-donor) to confirm the fluctuations and possibly use both sensors in conjunction to help boost the signal to noise ratio.

Figure 4:
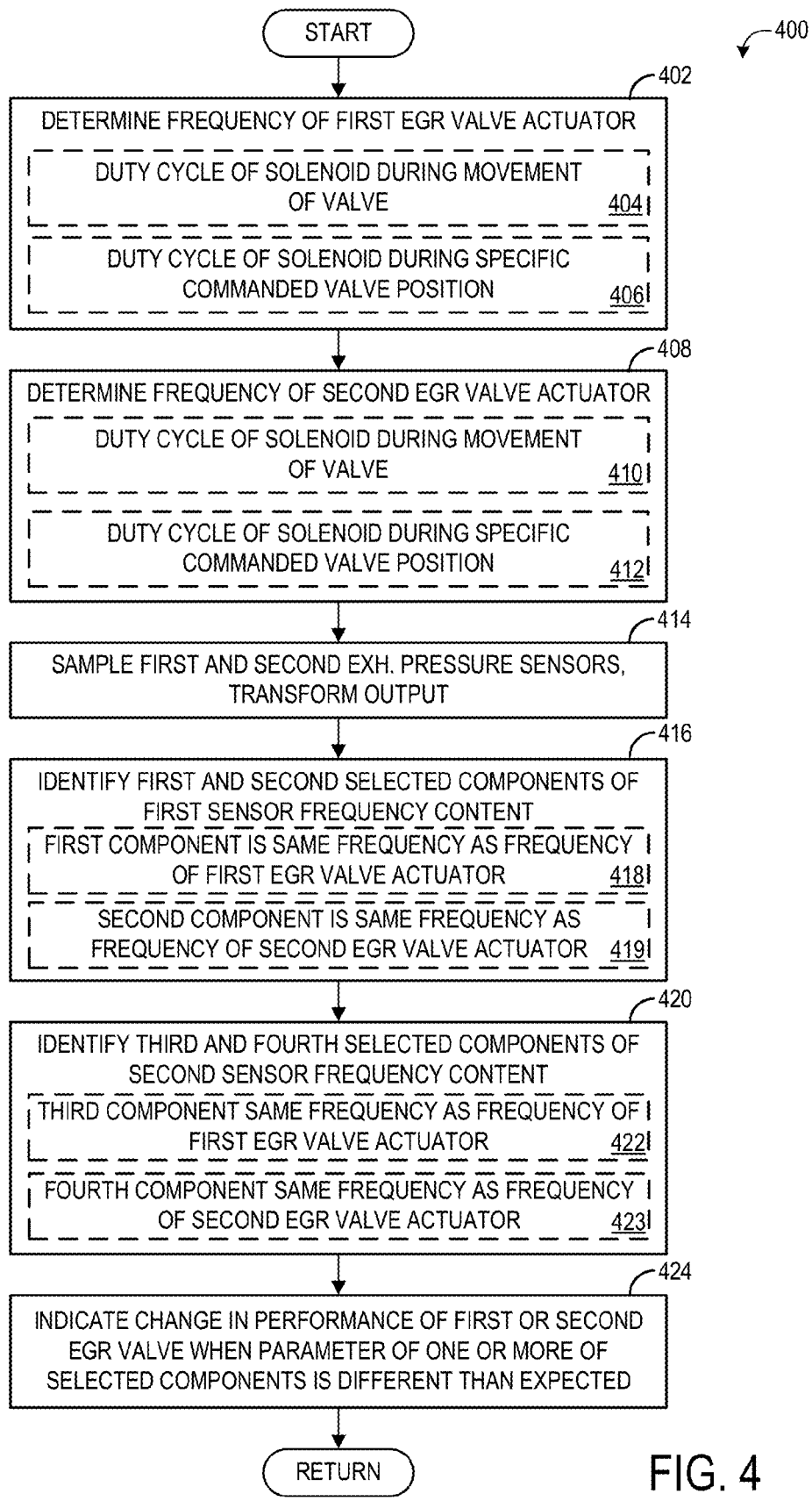
FIG. 4 is a flow chart illustrating a method for diagnosing an exhaust gas recirculation valve based on output from one or more pressure sensors.

FIG. 4 is a flow chart illustrating a method 400 for performing an engine diagnostic routine to determine the health of one or more EGR valves based on output from a first pressure sensor and a second pressure sensor. The first pressure sensor may measure pressure of a first exhaust manifold that is configured to provide EGR to the engine, also referred to as a donor cylinder manifold. An example of such a manifold is exhaust manifold 119 of FIG. 1 and an example of such a sensor is sensor 191 of FIG. 1. The second pressure sensor may measure pressure of a second exhaust manifold that is configured to provide all exhaust to atmosphere, also referred to as a non-donor cylinder manifold. An example of such a manifold is exhaust manifold 117 of FIG. 1 and an example of such a sensor is sensor 190 of FIG. 1. The one or more EGR valves may include a first EGR valve configured to control flow of exhaust from the first exhaust manifold to the intake manifold of the engine (such as valve 170 of FIG. 1) and a second EGR valve configured to control flow of exhaust from the first exhaust manifold to the exhaust system (such as valve 164 of FIG. 1).

At 402, method 400 includes determining a frequency of an actuator of the first EGR valve. As explained above with respect to FIG. 1, each of the first and second EGR valves may be moved by a hydraulic actuator that rotates a butterfly valve plate according to the relative volume of chambers on either side of a piston of the actuator. To control the volumes of the chambers, a solenoid may be activated to supply the chamber(s) with oil, for example. The solenoid of each actuator may have a duty cycle (e.g., pulse width modulation) at which it operates to move the respective EGR valve and/or maintain the respective EGR valve in a given position. Further, the oil may be supplied via a pump, which may have a duty cycle at which it operates to supply oil at the requisite pressure.

Thus, the frequency of the actuator of the first EGR valve may include the duty cycle of the solenoid of the actuator and/or it may include the duty cycle of the pump. The duty cycle determined at 402 may include the duty cycle of the solenoid when the actuator is adjusting the position of the first EGR valve, as indicated at 404. In other examples, the duty cycle determined at 402 may include the duty cycle of the solenoid when the actuator is holding the first EGR valve in a given position, as indicated at 406. Further, the duty cycle determined at 402 may be the duty cycle of the solenoid at a current position of the first EGR valve, or the method may include moving the first EGR valve to a predetermined position (e.g., fully closed) and determining the duty cycle during the movement or once the first EGR valve has reached the predetermined position.

At 408, method 400 includes determining a frequency of an actuator of the second EGR valve. The frequency of the actuator of the second EGR valve may include the duty cycle of the solenoid of the actuator and/or the duty cycle of the pump. The duty cycle determined at 408 may include the duty cycle of the solenoid when the actuator is adjusting the position of the second EGR valve, as indicated at 410. In other examples, the duty cycle determined at 408 may include the duty cycle of the solenoid when the actuator is holding the second EGR valve in a given position, as indicated at 412. Further, the duty cycle determined at 408 may be the duty cycle of the solenoid at the current position of the second EGR valve, or the method may include moving the second EGR valve to a predetermined position (e.g., fully open) and determining the duty cycle during the movement or once the second EGR valve has reached the predetermined position.

At 414, method 400 includes sampling the first and second exhaust pressure sensors and transforming the output of the sensors, similar to the sampling and transforming described above with respect to FIG. 3. At 416, method 400 includes identifying a first selected frequency component and a second selected frequency component of the frequency content of the signal output by the first pressure sensor. In some examples, as indicated at 418, the first selected frequency component may be the same frequency of the actuator of the first EGR valve, described above. Further, as indicated at 419, the second selected frequency component may be the same frequency of the actuator of the second EGR valve, described above.

At 420, method 400 includes identifying a third selected frequency component and a fourth selected frequency component of the frequency content of the signal output by the second pressure sensor. In some examples, as indicated at 422, the third selected frequency component may be the same frequency of the actuator of the first EGR valve, described above. Further, as indicated at 423, the fourth selected frequency component may be the same frequency of the actuator of the second EGR valve, described above.

At 424, method 400 includes indicating a change in performance of the first or second EGR valve when a parameter of one or more of the identified selected frequency components is different than expected. In one example, a change in performance for the first EGR valve may be indicated when a magnitude of a selected frequency component of a signal output from the first pressure sensor (e.g., the sensor coupled to the first, donor exhaust manifold) is greater than a threshold, where the selected frequency component is the same frequency as the actuator of the first EGR valve (e.g., when a magnitude of the first selected frequency component is greater than a threshold). In some examples, the change in performance of the first EGR valve may be indicated solely based on the frequency content of the first pressure sensor. In other examples, the change in performance of the first EGR valve may be indicated only when both the first selected frequency component and second selected frequency component are greater than respective thresholds, as both exhaust pressure sensors may detect the exhaust pressure pulsations resulting from dithering of the first EGR valve.

Likewise, in one example, a change in performance for the second EGR valve may be indicated when a magnitude of a selected frequency component of a signal output from the second pressure sensor (e.g., the sensor coupled to the second, non-donor exhaust manifold) is greater than a threshold, where the selected frequency component is the same frequency as the actuator of the second EGR valve (e.g., when a magnitude of the third selected frequency component is greater than a threshold). In some examples, the change in performance of the second EGR valve may be indicated solely based on the frequency content of the second pressure sensor. In other examples, the change in performance of the second EGR valve may be indicated only when both the third selected frequency component and fourth selected frequency component are greater than respective thresholds, as both exhaust pressure sensors may detect the exhaust pressure pulsations resulting from dithering of the second EGR valve.

Figure 6:
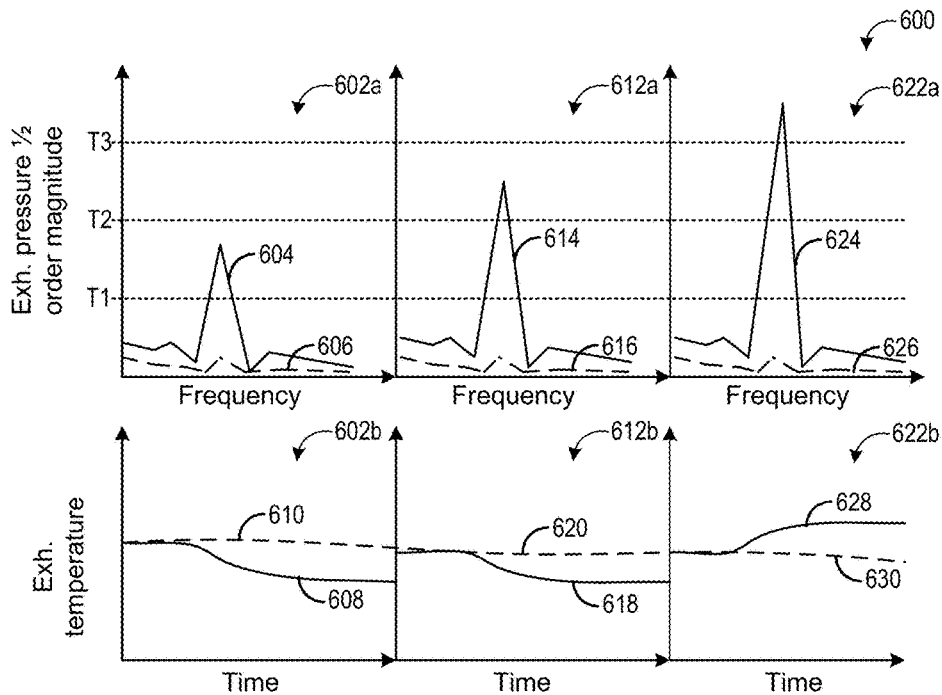
FIG. 6 is a diagram illustrating example frequency components of signals output by exhaust pressure sensors and example exhaust temperatures during different cylinder change in performance events.

FIG. 6 is a diagram 600 showing example frequency components and exhaust temperatures that may be observed during select cylinder change in performance events. Diagram 600 includes a first set of plots 602a and 602b, a second set of plots 612a and 612b, and a third set of plots 622a and 622b. Each set of plots includes an example plot of half order frequency components of two exhaust pressure sensors (one for each exhaust manifold) and an example plot of exhaust temperature (for each exhaust manifold). It is to be understood that each set of plots represents discrete, non-overlapping cylinder events.

Referring to the first set of plots, plot 602a and plot 602b illustrate the frequency components of the pressure sensor output and the exhaust temperature during a weak or dead fuel injector event of a cylinder of a first subset of cylinders, such as a cylinder from the donor cylinder group of FIG. 1. As a result of the weak or dead injector, that cylinder coupled to the weak or dead injector receives little or no fuel. The remaining cylinders of both the first subset of cylinders and a second subset of cylinders are not undergoing a change in performance.

Plot 602a illustrates the half-order frequency component for the output from a first exhaust pressure sensor (sensing exhaust pressure of a first exhaust manifold, such as donor exhaust manifold 119 of FIG. 1), as shown by curve 604. Plot 602a also illustrates the half-order frequency component for the output from a second exhaust pressure sensor (sensing exhaust pressure of a second exhaust manifold, such as non-donor manifold 117 of FIG. 1), as shown by curve 606. Plot 602a depicts frequency of the pressure sensor output along the horizontal (x-axis) and the magnitude of the frequency component (herein, the half-order frequency component) on the vertical (y-axis). Plot 602b illustrates exhaust temperature of the first exhaust manifold, as shown by curve 608, and exhaust temperature of the second exhaust manifold, as shown by curve 610. Plot 602b depicts time along the x-axis and exhaust temperature along the y-axis.

As shown by plots 602a and 602b, during a cylinder change in performance resulting from a weak or dead fuel injector, the magnitude of the half-order frequency component of the first exhaust pressure sensor is above a first threshold T1, indicating the cylinder change in performance for a cylinder coupled to the first exhaust manifold (e.g., a donor cylinder). Further, the exhaust temperature for the first exhaust manifold is reduced relative to the exhaust temperature for the second exhaust manifold, owing to the lack of combustion occurring in the cylinder with the weak/dead injector.

Referring to the second set of plots, plot 612a and plot 602b illustrate the frequency components of the pressure sensor output and the exhaust temperature during a degraded (e.g., stuck open) exhaust valve event of a cylinder of the first subset of cylinders, such as a cylinder from the donor cylinder group of FIG. 1. As a result of the degraded exhaust valve, that cylinder coupled to the degraded exhaust valve does not undergo compression, and as such the cylinder does not release exhaust gas in a discrete pulse. The remaining cylinders of both the first subset of cylinders and a second subset of cylinders are not undergoing a change in performance.

Plot 612a illustrates the half-order frequency component for the output from the first exhaust pressure sensor, as shown by curve 614. Plot 612a also illustrates the half-order frequency component for the output from the second exhaust pressure sensor, as shown by curve 616. Plot 602b illustrates exhaust temperature of the first exhaust manifold, as shown by curve 620, and exhaust temperature of the second exhaust manifold, as shown by curve 618. Plot 612b depicts time along the x-axis and exhaust temperature along the y-axis.

As shown by plots 612a and 612b, during a cylinder change in performance resulting from a stuck open or stuck closed cylinder exhaust valve, the magnitude of the half-order frequency component of the first exhaust pressure sensor is above a second threshold T2, indicating the cylinder change in performance for a cylinder coupled to the first exhaust manifold (e.g., a donor cylinder). Further, the exhaust temperature for the first exhaust manifold is reduced relative to the exhaust temperature for the second exhaust manifold, owing to the lack of combustion/exhaust release from the cylinder with the degraded exhaust valve.

Referring to the third set of plots, plot 622a and plot 622b illustrate the frequency components of the pressure sensor output and the exhaust temperature during an over-fueling event of a cylinder of the first subset of cylinders, such as a cylinder from the donor cylinder group of FIG. 1. As a result of the over-fueling (due to a degraded fuel injector, for example), that cylinder coupled to the degraded fuel injector receives excess fuel and may produce more exhaust gas, at a higher pressure, than other cylinders. The remaining cylinders of both the first subset of cylinders and a second subset of cylinders are not undergoing a change in performance.

Plot 622a illustrates the half-order frequency component for the output from the first exhaust pressure sensor, as shown by curve 624. Plot 622a also illustrates the half-order frequency component for the output from the second exhaust pressure sensor, as shown by curve 626. Plot 602b illustrates exhaust temperature of the first exhaust manifold, as shown by curve 628, and exhaust temperature of the second exhaust manifold, as shown by curve 630. Plot 622b depicts time along the x-axis and exhaust temperature along the y-axis.

As shown by plots 612a and 612b, during a cylinder change in performance resulting from degraded fuel injector that results in over-fueling (e.g., the fuel injector is stuck open), the magnitude of the half-order frequency component of the first exhaust pressure sensor is above a third threshold T3, indicating the cylinder change in performance for a cylinder coupled to the first exhaust manifold (e.g., a donor cylinder). Further, the exhaust temperature for the first exhaust manifold is increased relative to the exhaust temperature for the second exhaust manifold, owing to the excess combustion/exhaust release from the cylinder with the degraded fuel injector.

In this way, different types of cylinder change in performance may be differentiated based on the magnitude of the half-order frequency response of the exhaust pressure sensor output, and further based on exhaust temperature. For example, as shown by the plots of FIG. 6, a weak/dead fuel injector may result in a lower magnitude of the half-order frequency component relative to a stuck open cylinder exhaust valve or over-fueling fuel injector. Likewise, the stuck open cylinder exhaust valve may result in a lower magnitude of the half-order frequency component relative to the over-fueling fuel injector. Accordingly, a cylinder that has a dead or weak fuel injector may be indicated when the magnitude of the half-order frequency component is greater than a first threshold magnitude but less than a second threshold magnitude, a cylinder that has a degraded cylinder exhaust valve may be indicated when the magnitude of the half-order frequency component is greater than the first threshold magnitude and the second threshold magnitude yet is less than a third threshold magnitude, while a cylinder that has a degraded fuel injector that injects too much fuel may be indicated when the magnitude of the half-order frequency component is greater than the first threshold magnitude, the second threshold magnitude, and the third threshold magnitude.

Thus, during an over-fueling event, unlike the dead cylinders or valve issues, the occurrences of this half order response will be the opposite, in that the unique occurrences every other revolution that show up in the half-order response will be a higher exhaust pressure rather than the lack of an exhaust pulse. This type of half order response may be much higher than an injector or valve cut out. In the over-fueling situation, a high half order response in exhaust pressure from that bank plus an increase in exhaust temperature in that bank may be observed. In the event of a dead cylinder, the overall exhaust temperature may rise but the bank with the dead cylinder (the bank which has the high half order) will have a lower exhaust temperature compared to the healthy bank. In the case of an over-fueling cylinder you will see the bank with the high half order response will also have a higher exhaust temperature in that bank due to over-fueling.

FIG. 7 is a diagram 700 including a set of plots illustrating the half-order frequency components output by the first and second exhaust pressure sensors when a cylinder of the donor cylinder group (e.g., the first subset of cylinders coupled to the first exhaust manifold) is undergoing a change in performance, during both a first mode, where all exhaust gas from the first exhaust manifold is delivered to the intake manifold (also referred to as full EGR), and during a second mode, where no exhaust gas from the first exhaust manifold is delivered to the intake manifold (also referred to as EGR disabled or no EGR).

Plots 702 and 710 each illustrate respective half-order frequency components for the output from a first exhaust pressure sensor (sensing exhaust pressure of a first exhaust manifold, such as donor exhaust manifold 119 of FIG. 1), as shown by curve 704 and by curve 712. Plots 702 and 710 also illustrate the half-order frequency component for the output from a second exhaust pressure sensor (sensing exhaust pressure of a second exhaust manifold, such as non-donor manifold 117 of FIG. 1), as shown by curve 706 and curve 714. Plots 702 and 710 depict frequency of the pressure sensor output along the horizontal (x-axis) and the magnitude of the frequency component (herein, the half-order frequency component) on the vertical (y-axis). Plot 720 illustrates EGR valve position for a first EGR valve (curve 722) and a second EGR valve (724). Plot 720 depicts time along the x-axis and valve position along the y-axis.

At the beginning of the time shown in diagram 700, the engine is operating in the EGR disabled mode, where all exhaust gas from the first exhaust manifold is directed to the exhaust system, and no exhaust gas is directed to the intake manifold, as indicated by the first EGR valve being closed (blocking flow of exhaust to the intake) and the second EGR valve being open (allowing flow of exhaust to the exhaust system). During the EGR disabled mode, fluidic communication may occur between the two exhaust manifolds. Accordingly, a half-order response is observed in the output of both exhaust pressure sensors, as shown by curves 704 and 706. For example, the magnitude of the half-order frequency component is greater than the first threshold T1. However, the output of the second sensor may be lower than that of the first sensor, given that the cylinder with the change in performance is coupled to the first exhaust manifold. Due to the fluidic communication between the exhaust manifolds in the no EGR mode, the magnitude of the half-order frequency component of the second pressure sensor may greater than a fourth threshold T4 (that is lower than the first threshold).

The engine then shifts to operate in the full EGR mode, as shown by the first EGR valve being moved to the open position and the second EGR valve being moved to the closed position. Accordingly, the exhaust gas from the first exhaust manifold flows to the intake via the open first EGR valve and is blocked from reaching the exhaust system via the closed second EGR valve. A half-order response for the first pressure sensor is still observed, as shown by the magnitude being greater than the threshold T1 in curve 712. However, the half-order response for the second pressure sensor decreases to below the threshold T4, as shown by curve 714, due to the lack of fluidic communication between the two exhaust manifolds.

Thus, as appreciated by diagram 700, a change in cylinder performance of a cylinder of the donor cylinder group may be indicated responsive to the exhaust pressure sensor coupled to the first (donor) exhaust manifold outputting an increased half-order frequency response during both the no EGR and full EGR modes (e.g., being outside a first threshold range of magnitudes). Further, at least in some examples, the change in performance may only be indicated when the exhaust pressure sensor coupled to the second (non-donor) exhaust manifold also outputs an increased half-order frequency response during no EGR mode (e.g., within the first range but outside a second range of magnitudes), but not during the full EGR mode (e.g., within the second range of magnitudes). Similarly, a change in cylinder performance of a cylinder of the non-donor cylinder group may be indicated responsive to the exhaust pressure sensor coupled to the second (non-donor) exhaust manifold outputting an increased half-order frequency response during both the no EGR and full EGR modes. Further, at least in some examples, the change in performance may only be indicated when the exhaust pressure sensor coupled to the first (donor) exhaust manifold also outputs an increased half-order frequency response during no EGR mode, but not during the full EGR mode.

An embodiment relates to a system including a first exhaust pressure sensor for sensing exhaust pressure of a first exhaust manifold of an engine, the first exhaust manifold coupled to a first subset of cylinders of the engine; a second exhaust pressure sensor for sensing exhaust pressure of a second exhaust manifold of the engine, the second exhaust manifold coupled to a second subset of cylinders of the engine; an exhaust gas recirculation (EGR) system including an EGR passage coupling the first exhaust manifold to an intake manifold of the engine; and a controller configured to: detect a change in performance of any cylinder of the engine based on frequency content from the first exhaust pressure sensor and frequency content from the second exhaust pressure sensor during both a first mode where no exhaust gas from the first exhaust manifold is provided to the intake manifold, and during a second mode where all exhaust gas from the first exhaust manifold is provided to the intake manifold; and adjust one or more engine operating parameters responsive to detecting the change in performance.

The controller may be further configured to: during the first mode, identify a first magnitude of a first selected frequency component of the frequency content of the first exhaust pressure sensor and identify a second magnitude of a second selected frequency component of the frequency content of the second exhaust pressure sensor; during the second mode, identify a third magnitude of the first selected frequency component of the frequency content of the first exhaust pressure sensor and identify a fourth magnitude of the second selected frequency component of the frequency content of the second exhaust pressure sensor; and indicate a change in performance of a cylinder of the first subset of cylinders when the first magnitude is outside a first threshold range of magnitudes, the second magnitude is outside a second threshold range of magnitudes, the third magnitude is outside the first threshold range of magnitudes, and the fourth magnitude is within the second threshold range of magnitudes, wherein the first selected frequency component is a half-order frequency component of the frequency content of the first exhaust pressure sensor, and the second selected frequency component is a half-order frequency component of the frequency content of the second exhaust pressure sensor.

The controller may be further configured to indicate a change in performance of a cylinder of the second subset of cylinders when the first magnitude is outside the second threshold range of magnitudes, the second magnitude is outside the first threshold range of magnitudes, the third magnitude is within the second threshold range of magnitudes, and the fourth magnitude is outside the first threshold range of magnitudes. In an example, when the first magnitude is greater than the first threshold range of magnitudes and also greater than a third threshold magnitude and/or when exhaust gas temperature of the first exhaust manifold is greater than an expected value, the controller is configured to indicate that the change in cylinder performance is a cylinder over-fuel event of the first subset of cylinders, and when the first magnitude is greater than the first threshold range of magnitudes and also less than the third threshold magnitude and/or when exhaust gas temperature of the first exhaust manifold is less than the expected value, the controller is configured to indicate that the change in cylinder performance is a cylinder under-fuel event of the first subset of cylinders.

In an example, responsive to indicating the cylinder over-fuel event, the controller is configured to identify which cylinder is receiving excess fuel and reduce fueling to that cylinder. In examples, responsive to indicating the cylinder under-fuel event, the controller is configured to identify which cylinder is receiving a less than expected amount of fuel and increase fueling to remainder cylinders and/or adjust an EGR flow rate.

The system may further comprise an exhaust passage coupled to the second exhaust manifold, a first EGR valve configured to flow exhaust gas from the first exhaust manifold to the intake manifold via the EGR passage, and a second EGR valve configured to flow exhaust gas from the first exhaust manifold to the exhaust passage. In an example, during the second mode, the controller is configured to fully open the first EGR valve and fully close the second EGR valve to route all exhaust gas from the first exhaust manifold to the intake manifold, and wherein during the first mode, the controller is configured to fully close the first EGR valve and fully open the second EGR valve to route all exhaust gas from the first exhaust manifold to the exhaust passage and route no exhaust gas from the first exhaust manifold to the intake manifold. During both the first mode and the second mode, all exhaust gas from the second exhaust manifold may be routed to the exhaust passage.

Another embodiment of a system includes a first exhaust pressure sensor for sensing exhaust pressure of a first exhaust manifold of an engine, the first exhaust manifold coupled to a first subset of cylinders of the engine; a second exhaust pressure sensor for sensing exhaust pressure of a second exhaust manifold of the engine, the second exhaust manifold coupled to a second subset of cylinders of the engine; an exhaust gas recirculation (EGR) system including: an EGR passage coupling the first exhaust manifold to an intake manifold of the engine; a bypass passage coupling the first exhaust manifold to an exhaust passage downstream of the second exhaust manifold; and one or more EGR valves configured to control flow of EGR through the EGR passage and bypass passage; and a controller configured to detect a change in performance of the one or more EGR valves based on frequency content from the first exhaust pressure sensor and frequency content from the second exhaust pressure sensor, and adjust one or more engine operating parameters responsive to detecting the change in performance. In an example, the controller is configured to adjust a position of the one or more EGR valves responsive to detecting the change in performance.

In some examples, the one or more EGR valves comprises a first EGR valve positioned in the EGR passage and a second EGR valve positioned in the bypass passage. In such examples, to detect the change in performance of the first EGR valve, the controller is configured to identify a first frequency component of the frequency content of the first exhaust pressure sensor and a second frequency component of the frequency content of the second exhaust pressure sensor, the first frequency component and second frequency component each associated with movement of the first EGR valve, and if a parameter of one or more of the first frequency component and second frequency component is different than expected, indicate a change in performance of the first EGR valve. To detect the change in performance of the second EGR valve, the controller is configured to identify a third frequency component of the frequency content of the first exhaust pressure sensor and a fourth frequency component of the frequency content of the second exhaust pressure sensor, the third frequency component and fourth frequency component each associated with movement of the second EGR valve, and if a parameter of one or more of the third frequency component and fourth frequency component is different than expected, indicate a change in performance of the second EGR valve. The first EGR valve may include an actuator having a solenoid, and wherein the first frequency component and the second frequency component each correspond to a pulse-width modulation frequency of the solenoid.

An embodiment of a system includes a first exhaust pressure sensor for sensing exhaust pressure of a first exhaust manifold of an engine, the first exhaust manifold coupled to a first subset of cylinders of the engine; a second exhaust pressure sensor for sensing exhaust pressure of a second exhaust manifold of the engine, the second exhaust manifold coupled to a second subset of cylinders of the engine; an exhaust gas recirculation (EGR) system including: an EGR passage coupling the first exhaust manifold to an intake manifold of the engine; a bypass passage coupling the first exhaust manifold to an exhaust passage downstream of the second exhaust manifold; and one or more EGR valves configured to control flow of EGR through the EGR passage and bypass passage; and a controller configured to: detect a change in performance of any cylinder of the engine based on frequency content from the first exhaust pressure sensor and frequency content from the second exhaust pressure sensor during both a first mode where no exhaust gas from the first exhaust manifold is provided to the intake manifold, and during a second mode where all exhaust gas from the first exhaust manifold is provided to the intake manifold; detect a change in performance of the one or more EGR valves based on frequency content from the first exhaust pressure sensor and frequency content from the second exhaust pressure sensor; and adjust one or more engine operating parameters responsive to detecting the change in performance in the cylinder of the engine or in the one or more EGR valves.

The controller may be configured to detect the change in performance of any cylinder of the engine based on a half-order frequency component of the frequency content from the first exhaust pressure sensor and a half-order frequency component of the frequency content from the second exhaust pressure sensor. The controller may be configured to detect the change in performance of the one or more EGR valves based on a first frequency component of the frequency content from the first exhaust pressure sensor and a second frequency component of the frequency content from the first exhaust pressure sensor, each of the first frequency component and second frequency component associated with movement of the one or more EGR valves.

In examples, the first subset of cylinders is arranged on a first bank and the second subset of cylinders is arranged on a second bank. In examples, the system further includes a turbocharger including a turbine coupled in the exhaust passage and a third exhaust pressure sensor positioned at an inlet of the turbine, and the controller is configured to detect a change in performance of the turbine based on a magnitude of a selected frequency component of frequency content output by the third exhaust pressure sensor.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a first exhaust pressure sensor for sensing exhaust pressure of a first exhaust manifold of an engine, the first exhaust manifold coupled to a first subset of cylinders of the engine;
   a second exhaust pressure sensor for sensing exhaust pressure of a second exhaust manifold of the engine, the second exhaust manifold coupled to a second subset of cylinders of the engine;
   an exhaust gas recirculation (EGR) system including a first EGR valve, a second EGR valve, an EGR passage coupling the first exhaust manifold to an intake manifold of the engine, and an EGR bypass passage for routing exhaust gas from the first exhaust manifold to an exhaust passage; and
   a controller configured to:
      detect a change in performance of a cylinder of the engine based on frequency content from the first exhaust pressure sensor and frequency content from the second exhaust pressure sensor during both a first mode where no exhaust gas from the first exhaust manifold is provided to the intake manifold, and during a second mode where all exhaust gas from the first exhaust manifold is provided to the intake manifold; and
      adjust at least one parameter of engine operating conditions responsive to the change in performance having been detected;
      wherein the at least one parameter of the engine operating conditions comprises at least one of: a change in cylinder performance of a cylinder under-fuel event and a cylinder over-fuel event or a change in EGR flow rate via opening and closing the first EGR valve and the second EGR valve.

2. The system of claim 1, wherein the controller is configured to:
   during the first mode, identify a first magnitude of a first selected frequency component of the frequency content of the first exhaust pressure sensor and identify a second magnitude of a second selected frequency component of the frequency content of the second exhaust pressure sensor;
   during the second mode, identify a third magnitude of the first selected frequency component of the frequency content of the first exhaust pressure sensor and identify a fourth magnitude of the second selected frequency component of the frequency content of the second exhaust pressure sensor; and
   indicate a change in performance of a cylinder of the first subset of cylinders when the first magnitude is outside a first threshold range of magnitudes, the second magnitude is outside a second threshold range of magnitudes, the third magnitude is outside the first threshold range of magnitudes, and the fourth magnitude is within the second threshold range of magnitudes, wherein the first selected frequency component is a half-order frequency component of the frequency content of the first exhaust pressure sensor, and the second selected frequency component is a half-order frequency component of the frequency content of the second exhaust pressure sensor.

3. The system of claim 2, wherein the controller is configured to:
   indicate a change in performance of a cylinder of the second subset of cylinders when the first magnitude is outside the second threshold range of magnitudes, the second magnitude is outside the first threshold range of magnitudes, the third magnitude is within the second threshold range of magnitudes, and the fourth magnitude is outside the first threshold range of magnitudes.

4. The system of claim 2, wherein during at least one of the first magnitude being greater than the first threshold range of magnitudes and also greater than a third threshold magnitude or exhaust gas temperature of the first exhaust manifold being greater than an expected value, the controller is configured to indicate that the change in cylinder performance is a cylinder over-fuel event of the first subset of cylinders, and during at least one of the first magnitude being greater than the first threshold range of magnitudes and also less than the third threshold magnitude or the exhaust gas temperature of the first exhaust manifold being less than the expected value, the controller is configured to indicate that the change in cylinder performance is a cylinder under-fuel event of the first subset of cylinders.

5. The system of claim 4, wherein, in response to the cylinder over-fuel event, the controller, after identifying which cylinder of the first subset of cylinders received a fuel amount being in excess of an expected fuel amount via at least one sensor, adjusts a fuel injector to reduce fueling to that cylinder.

6. The system of claim 4, wherein, responsive to indicating the cylinder under-fuel event, the controller, after identifying is configured to identify which cylinder of the first subset of cylinders received a fuel amount being less than an expected fuel amount, adjusts at least one of a fuel injector to of fuel and increase fueling to remainder cylinders of the first subset of cylinders, and an EGR flow rate via actuating the first EGR valve and the second EGR valve.

7. The system of claim 1, wherein the exhaust passage is coupled to the second exhaust manifold.

8. The system of claim 7, wherein during the second mode, the controller is configured to fully open the first EGR valve in the EGR passage coupling the first exhaust manifold to the intake manifold of the engine and fully close the second EGR valve to route all exhaust gas from the first exhaust manifold to the intake manifold, and wherein during the first mode, the controller is configured to fully close the first EGR valve and fully open the second EGR valve to route all exhaust gas from the first exhaust manifold to the exhaust passage and prevent the exhaust gas from the first exhaust manifold to the intake manifold.

9. The system of claim 7, wherein during both the first mode and the second mode, all exhaust gas from the second exhaust manifold is routed to the exhaust passage.

10. A system, comprising:
    a first exhaust pressure sensor for sensing exhaust pressure of a first exhaust manifold of an engine, the first exhaust manifold coupled to a first subset of cylinders of the engine;

a second exhaust pressure sensor for sensing exhaust pressure of a second exhaust manifold of the engine, the second exhaust manifold coupled to a second subset of cylinders of the engine;

an exhaust gas recirculation (EGR) system including:
an EGR passage coupling the first exhaust manifold to an intake manifold of the engine;
a bypass passage coupling the first exhaust manifold to an exhaust passage downstream of the second exhaust manifold; and
one or more EGR valves configured to control flow of EGR through the EGR passage and bypass passage; and a controller configured to detect a change in performance of the one or more EGR valves based on frequency content from the first exhaust pressure sensor and frequency content from the second exhaust pressure sensor, and adjust an EGR flow rate to the engine responsive to detecting the change in performance, via opening and closing the one or more EGR valves.

11. The system of claim 10, wherein the one or more EGR valves comprises a first EGR valve positioned in the EGR passage and a second EGR valve positioned in the bypass passage.

12. The system of claim 11, wherein to detect the change in performance of the first EGR valve, the controller is configured to identify a first frequency component of the frequency content of the first exhaust pressure sensor and a second frequency component of the frequency content of the second exhaust pressure sensor, the first frequency component and second frequency component each associated with movement of the first EGR valve, and if a parameter of one or more of the first frequency component and second frequency component is different than an expected frequency component, indicate a change in performance of the first EGR valve.

13. The system of claim 12, wherein to detect the change in performance of the second EGR valve, the controller is configured to identify a third frequency component of the frequency content of the first exhaust pressure sensor and a fourth frequency component of the frequency content of the second exhaust pressure sensor, the third frequency component and fourth frequency component each associated with movement of the second EGR valve, and if a parameter of one or more of the third frequency component and fourth frequency component is different than an expected frequency component, indicate a change in performance of the second EGR valve.

14. The system of claim 12, wherein the first EGR valve includes an actuator having a solenoid, and wherein the first frequency component and the second frequency component each correspond to a pulse-width modulation frequency of the solenoid.

15. A system, comprising:
a first exhaust pressure sensor for sensing exhaust pressure of a first exhaust manifold of an engine, the first exhaust manifold coupled to a first subset of cylinders of the engine;
a second exhaust pressure sensor for sensing exhaust pressure of a second exhaust manifold of the engine, the second exhaust manifold coupled to a second subset of cylinders of the engine;
an exhaust gas recirculation (EGR) system including:
an EGR passage coupling the first exhaust manifold to an intake manifold of the engine;
a bypass passage coupling the first exhaust manifold to an exhaust passage downstream of the second exhaust manifold; and
one or more EGR valves configured to control flow of EGR through the EGR passage and bypass passage;
a turbocharger including a turbine coupled in the exhaust passage and a third exhaust pressure sensor positioned at an inlet of the turbine; and
a controller configured to:
detect a change in performance of any a cylinder of the engine based on frequency content from the first exhaust pressure sensor and frequency content from the second exhaust pressure sensor during both a first mode where no exhaust gas from the first exhaust manifold is provided to the intake manifold, and during a second mode where all exhaust gas from the first exhaust manifold is provided to the intake manifold;
detect a change in performance of the one or more EGR valves based on frequency content from the first exhaust pressure sensor and frequency content from the second exhaust pressure sensor; and
adjust at least one parameter of engine operating conditions responsive to the change in performance in at least one of the cylinder of the engine, the one or more EGR valves, and the turbine of the turbocharger.

16. The system of claim 15, wherein the controller is configured to detect the change in performance of the cylinder of the engine based on a half-order frequency component of the frequency content from the first exhaust pressure sensor and a half-order frequency component of the frequency content from the second exhaust pressure sensor.

17. The system of claim 15, wherein the controller is configured to detect the change in performance of the one or more EGR valves based on a first frequency component of the frequency content from the first exhaust pressure sensor and a second frequency component of the frequency content from the first exhaust pressure sensor, each of the first frequency component and second frequency component associated with movement of the one or more EGR valves.

18. The system of claim 15, wherein the first subset of cylinders is arranged on a first bank and the second subset of cylinders is arranged on a second bank.

19. The system of claim 15, wherein the controller is configured to detect a change in performance of the turbine based on a magnitude of a selected frequency component of frequency content output by the third exhaust pressure sensor.

* * * * *